United States Patent [19]

Akagi, Jr.

[11] Patent Number: 5,243,602
[45] Date of Patent: Sep. 7, 1993

[54] METHOD AND APPARATUS FOR TESTING BAR CODE DECODER ROUTINES

[75] Inventor: Joseph G. Akagi, Jr., Bothell, Wash.

[73] Assignee: Intermec Corporation, Everett, Wash.

[21] Appl. No.: 627,634

[22] Filed: Dec. 14, 1990

[51] Int. Cl.$^5$ .............................................. G06F 11/00
[52] U.S. Cl. .................................. 371/25.1; 235/438; 235/437
[58] Field of Search ............... 235/438, 437; 371/25.1, 371/21.2, 67.1, 16.1

[56] References Cited

U.S. PATENT DOCUMENTS

| | | | |
|---|---|---|---|
| 4,718,064 | 1/1988 | Edwards et al. | 371/16.2 |
| 4,742,521 | 5/1988 | Nishida | 235/437 |
| 5,003,251 | 3/1991 | Fuoco | 371/29.1 |
| 5,126,540 | 6/1992 | Kashiwagi et al. | 235/437 |

Primary Examiner—Robert W. Beausoliel, Jr.
Assistant Examiner—Phung M. Chung
Attorney, Agent, or Firm—Seed and Berry

[57] ABSTRACT

A method and apparatus for testing bar code reader devices. A computer is programmed to receive data indicative of output signals of input devices for reading symbologies and to produce signals representative of those corresponding to the output of an input device. The computer then sends these representative signals to a subject bar code reader and receives the resulting signals produced by the reader. The computer also compares the received resulting signals with the representative signals to determine any differences. If the differences are judged to be significant, the computer produces an indicative signal.

20 Claims, 2 Drawing Sheets

METHOD AND APPARATUS FOR TESTING BAR CODE DECODER ROUTINES

DESCRIPTION

1. Technical Field

The present invention relates to a method and apparatus for testing data communication devices, and more particularly, to a method and apparatus for testing symbology-reading input devices.

2. Background of the Invention

A symbology input device typically uses a sensing beam to read a symbology, such as a bar code, which consists of alternating areas ("bars") having differing characteristics to which the beam is sensitive. The input device then receives and interprets the fluctuations in the returning sensing beam that are caused by the symbology. For example, it is known in the prior art to read symbology by means of a hand-held wand which makes contact with the surface on which the symbology is printed and reads the symbology by means of a beam of light. It is also known to use a non-contact scanning device to cause a beam of light to scan across an area containing a bar code.

Such input devices typically transform the reflected scanning beam to an electronic form for decoding. Decoding includes both interpreting the received reflected signal as a representation of the alternating characteristics of the symbology, as well as checking the representation and producing the symbol or symbols being represented by the symbology. The decoding function is generally performed by a reader device which can include a microprocessor and associated memory devices for storing the program under which the microprocessor operates and tables of data which contain the correspondence between representations and the represented symbologies.

The reader can operate in accordance with one or more algorithms which interpret the received reflected signal, establish which symbology corresponds to the interpreted signal, and produces a signal representing the symbology which has been read by the input device. It is, accordingly, important that the reader both receive signals which properly represent the symbology which has been read and effectively interpret the received signals.

In the past, it has been necessary to check the operation of a reader and the quality of the signals which the input device produces by causing the input device to read known symbologies and checking the decoded result with the input. In some applications, an input device and reader are checked by having a human operator scan a large number of symbols and verify that each of the symbols is correctly read. This is a labor-intensive and lengthy procedure. To overcome these difficulties and to provide a facility for checking the performance of an input device as functions of both the angle and speed of the sensing beam relative to the symbology, an automated procedure and mechanism has been developed, as described in "Motion Control Spreads Its Wings," *DESIGN NEWS*, Aug. 6, 1990. Such solutions, however, require a substantial amount of delicate hardware. In addition, such solutions do not provide the capability of testing for other difficulties which present themselves when an input device is in actual use. For example, such solutions do not account for non-uniformities in the speed with which the sensing beam moves across the symbology, for example, as when an individual uses a hand-held wand input device.

It is also important to be able to compare the performance of two or more reader devices to the same received reflected signals, in order to develop better and more efficient decoding algorithms. In the past, this has been done by separately programming the algorithms into a reader and comparing the performance and time required for each of the algorithms to interpret a predetermined set of symbology. This is clearly an inefficient, tedious and potentially erroneous method of testing.

SUMMARY OF THE INVENTION

It is an object of the present invention to provide a method and apparatus for testing a symbology reader.

It is another object of the present invention to provide a method and apparatus for comparing the performance of two or more symbology readers.

It is still another object of the present invention to provide high-speed method and apparatus for testing a symbology reader.

It is a further object of the present invention to provide a reproducible method and apparatus for testing a symbology reader.

It is yet another object of the present invention to provide a reproducible method and apparatus for comparing the performance of two or more symbology readers.

In one aspect, the invention is a method for testing a subject symbology reader. The method comprises the steps of (a) controllably producing input signals substantially identical to those produced by a symbology input device when the symbology input device is reading a predetermined symbology, the predetermined symbology causing a symbology reader connected to the symbology input device to produce known desired response signals in response thereto, (b) directing the input signals to the subject symbology reader, (c) recording the response signals of the subject symbology reader to the input signals, and (d) comparing the response signals of the subject symbology reader to the known desired response signals.

In another aspect, the invention is an apparatus for testing a subject symbology reader. The apparatus comprises source means for controllably producing input signals substantially identical to those produced by a symbology input device when the symbology input device is reading a predetermined symbology, the predetermined symbology causing a symbology reader connected to the symbology input device to produce known desired response signals in response thereto, means for directing the input signals to the subject symbology reader, means for recording the response signals of the subject symbology reader to the input signals, and means for comparing the response signals of the subject symbology reader to the known desired response signals.

DETAILED DESCRIPTION OF THE INVENTION

Figure 1:
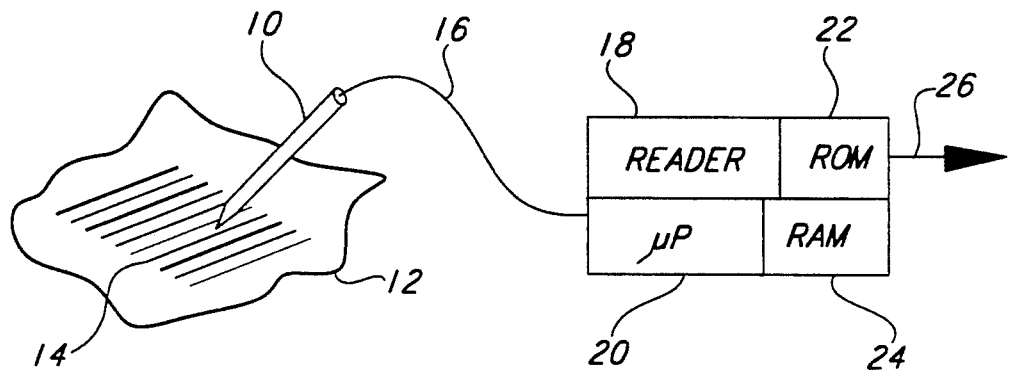
FIG. 1 is a schematic diagram of a symbology-reading system known in the prior art.

FIG. 1 is a schematic diagram of a symbology-reading system known in the prior art. An input device 10, such as a handheld wand, produces a sensing beam (not shown) which is directed by the input device 10 across an area 12 containing a symbology 14, such as a bar code symbology. The input device 10 receives reflections of the sensing beam and produces a video signal containing a sequence of representations of the contrasting areas in the symbology 14. These signals are typically compatible with transistor-transistor logic (TTL). They comprise analog signals that are composed of segments that are within a "high" band when the corresponding symbology 14 has one of two characteristic, such as being dark, and segments that are within a "low" band when the corresponding symbology 14 has the other of the two characteristics.

The TTL video signals are transmitted through some means, such as a cable 16, to a reader 18. In other embodiments, the transmission means can be a radio channel, or other suitable communications conduit. The reader 18 typically includes electronics, such as a microprocessor 20, which is programmed according to a program stored in a read-only memory (ROM) 22 when the reader is turned off. The ROM 22 also contains tables which are used by the reader 18 in interpreting and decoding signals corresponding to the TTL signals received over the cable 16. The tables can represent a number of possible symbologies, thus allowing the system shown in FIG. 1 to be useful in reading several different symbologies. The reader 18 also includes a random access memory (RAM) 24 which can contain the program and tables when the reader is in operation.

Through algorithms contained in the program operating in the microprocessor 20, the TTL signals are first transformed to series of counts, each representing the duration of the corresponding segment of the TTL signal. These series of counts are then compared to acceptable sequences of counts, depending upon the symbology being used. Based on the results of this comparison, the reader can determine which symbology is being read, and what symbol is represented by the TTL signal, according to that symbology. The reader 18 then produces an output signal, such as an ASCII signal, that represents the symbol that has been read by the input device 10. The output signal is transmitted on line 26 to other apparatus for use. The line 26 can, among other things, be a cable or a radio channel to a host computer, or an internal signal line to another microprocessor which further processes, and possibly stores, the symbol.

Figure 2:
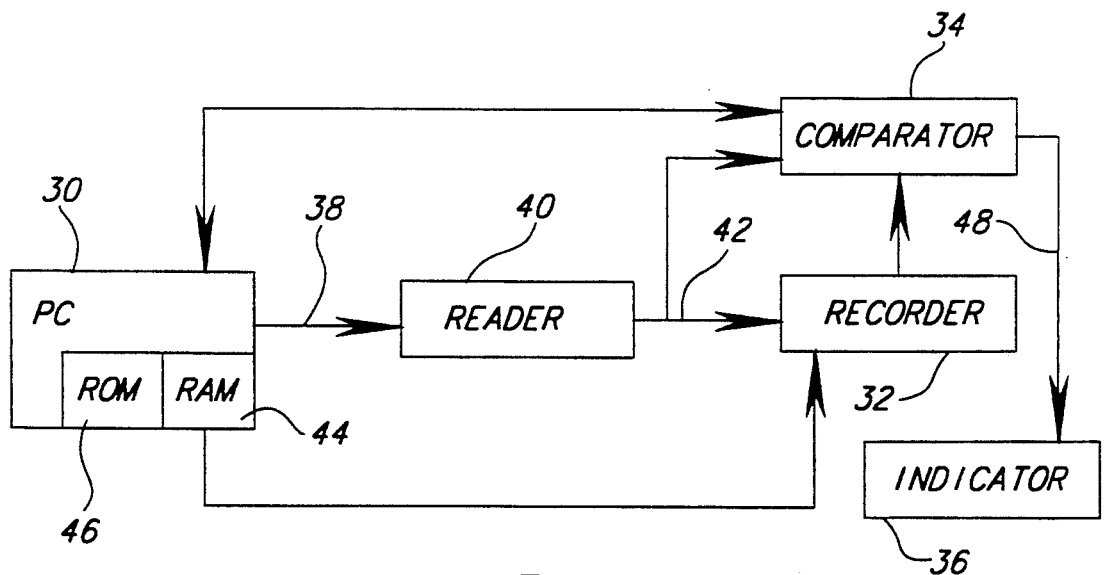
FIG. 2 is a schematic diagram of a first embodiment of the symbology reader-testing system of the present invention.

FIG. 2 is a schematic diagram of a first embodiment of the symbology reader-testing system of the present invention. The symbology reader-testing system comprises a computer system 30, such as a personal computer, a recorder 32, and a comparator 34. It may also alternatively include an indicator 36. The computer 30 produces signals which are similar to those produced by an input device, such as input device 10, shown in FIG. 1. These signals are transmitted over a line 38 to a reader 40 of the type to be tested, which is to be tested. In response to the signals transmitted over the line 38, the reader 40 produces an output signal on line 42, providing an ASCII representation of a symbol corresponding to the signal on line 38 to the recorder 32. In this way, the response of a typical, or standard reader 40 can be elicited to a series of signals produced by the computer 30. The signals produced by the computer 30 can be produced by a system such as that shown in FIG. 1. The signals on line 26 can be fed to the computer 30 prior to testing the response of the reader 40, and stored in a RAM 44 contained within the computer 30. The ROM 46 contains the program which causes the computer 30 to operate.

When it is desired to test a given reader 40, it is inserted into the system shown in FIG. 2 and activated by the computer 30 under control of its test program. The signals produced by the test reader 40 on the line 42 are then sent to the comparator 34 under the control of the computer 30. The comparator 34 also receives the previously-recorded signals contained in the recorder 32, under control of the computer 30. The comparator 34 continuously compares the signals produced by the test reader 40 with the signals stored in the recorder 32 and produces signals indicative of the comparison on the line 48, which is connected between the comparator 34 and the indicator 36. Depending upon how the computer 30 is programmed, the comparator 34 can produce signals which activate the indicator 36 (which can be a display device) only when the two signals are judged to be significantly different. Alternatively, the computer 30 can be programmed to cause the comparator 34 to display any differences between the two sets of signals, and to indicate exactly their differences. As a further alternative, the indicator 36 can be caused to show all signals, and indicate whether they are identical, insignificantly different, or significantly different, and what those differences are.

Figure 3:
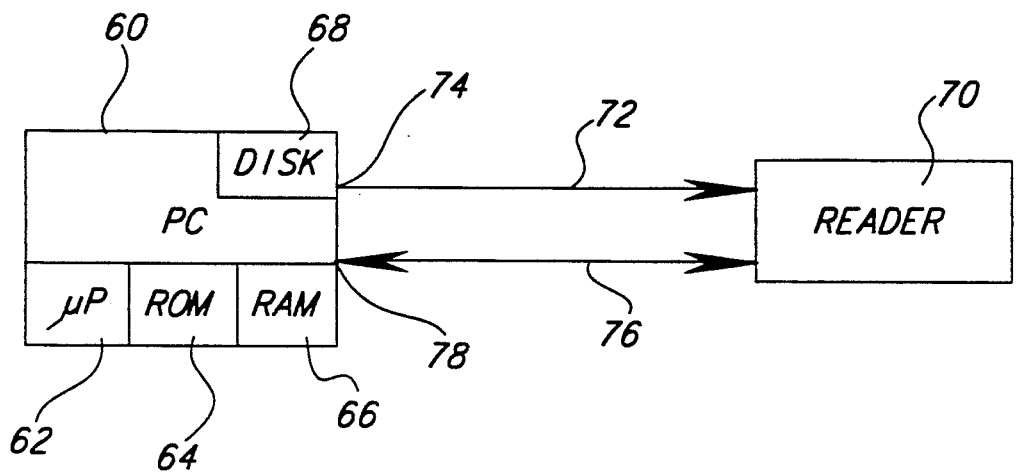
FIG. 3 is a schematic diagram of a second embodiment of the symbology reader-testing system of the present invention.

FIG. 3 is a schematic diagram of a second embodiment of the symbology reader-testing system of the present invention. In this embodiment, many of the functions of the system shown in FIG. 2 have been incorporated into the computer 60. The computer 60, which includes a microprocessor 62, a ROM 64, a RAM 66 and a disk device 68, operates under the control of the microprocessor 62 in accordance with a program stored in the RAM 66. When the computer 60 is turned off, the program is stored in the ROM 64 and transferred to the computer 60 when it is turned on again. The computer 60 is connected to a test reader 70 by a line 72 connected to the computer's parallel printer port 74, or other suitable output port. The computer 60 produces signals which are substantially identical to those produced by an input device 10 on line 16 (see FIG. 1). The signals on the parallel printer port 74 can drive eight separate signal lines at TTL voltage levels. Each of the lines can be driven separately. There is no randomness in the signals generated. The signals are accurate to within plus or minus one count of 250 nanosecond. The output signals of wands, laser and scanners as the pass over the light and dark areas of the symbology are digital. A high signal is represented by a voltage level in excess of 3.75 volts DC, and a low signal is represented by a voltage level that is less than 0.75 volts DC. These signals can be produced by the computer 60 in response to data stored in the RAM 66, which has been transferred from the disk 68, these data having been recorded during a previous test of a standard reader. In this way, the computer 60 serves the same function as the recorder 32, shown in FIG. 2.

In response to the signals received over the line 72, the test reader 70 produces output signals on the line 76, which may be part of an RS-232C communications link. The line 76 can connect to the serial I/O port 78 of the computer 60, through which the computer 60 receives the signals from the test reader 70.

The computer 60 can also serve to compare the signals received from the test reader 70 over the line 76 through the port 78 with the corresponding signals stored in the RAM 66. In this way, the computer 60 also serves the function of the comparator 34 (shown in FIG. 2). If the program operating the computer 60 detects any discrepancy between the two signals, it can produce an indication signal representing an error. Alternatively, the program operating the computer 60 can be made to detect more subtle, but acceptable, differences between the two signals, and produce a signal indicative of such a difference. The computer 60 can also, of course, produce a signal indicative that the two input signals are identical.

The computer 60 can also serve as the indicator 36 (see FIG. 2). It can provide an indicator signals to activate its display device (not shown), its speaker, or other means of indication it might have. The data resulting from the comparison can also be stored on the disk drive 68 for further, subsequent study.

Figure 4:
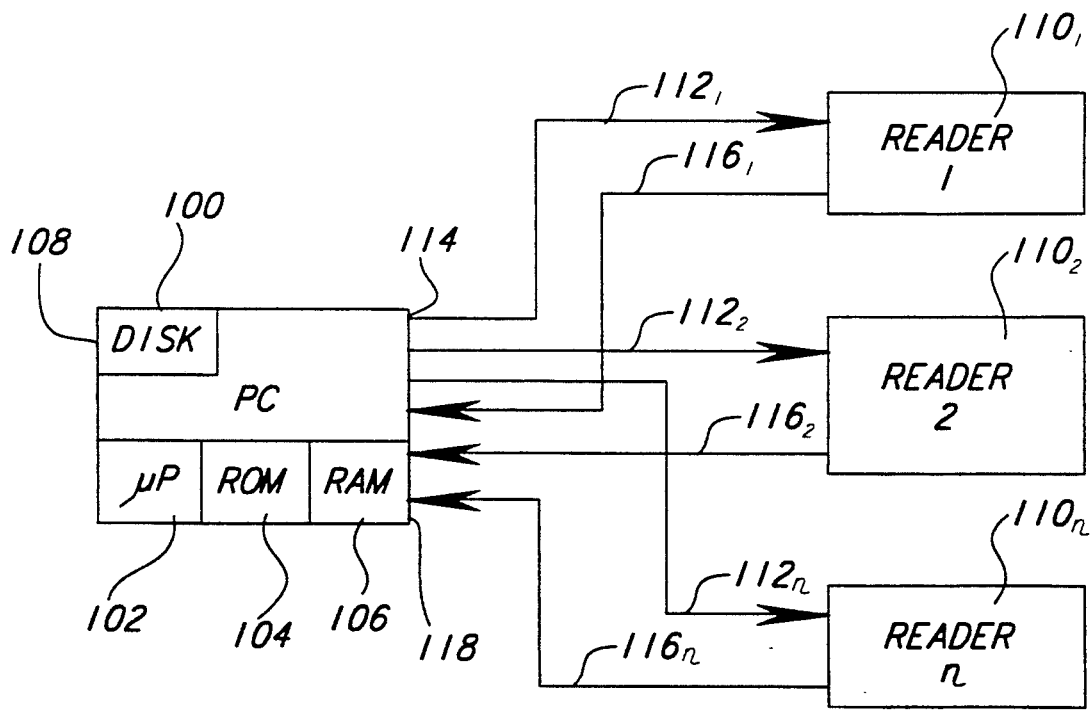
FIG. 4 is a schematic diagram of a third embodiment of the symbology reader-testing system of the present invention.

FIG. 4 is a schematic diagram of a third embodiment of the symbology reader-testing system of the present invention. The computer 100 contains a microprocessor 102, a RAM 104, a ROM 106 and a disk drive 106. The computer 100 can be connected to a plurality of test readers $110_1$, $110_2$, ..., $110_n$. The computer 100 operates according to the program stored in ROM 106 when the computer 100 is off and in the RAM 104 when the computer 100 is on. The computer 100 can cause each of the test readers $110_i$ to receive a different signal (or the same signals) through the respective lines $112_i$, which are typically part of a cable connected to the parallel printer port 114 of the computer 100. The response signals of each of the test readers $110_i$ is received through the lines $116_i$, which are connected to the serial I/O port 118 of the computer 100.

The apparatus of FIG. 4 can be used to compare the performance of various reader algorithms. This can be accomplished by programming each of the readers $110_i$ to operate according to a different algorithm, and comparing the results.

The signals representative of the response of an input device are not necessarily simply data taken under ideal conditions. They can be taken from an input device which is operated less than optimally, such as a wand which is held at an extreme angle with respect to the symbology, or a wand which is scanned across the symbology at an uneven rate.

While the foregoing has been a discussion of a specific embodiment of the present invention, those skilled in the art will appreciate that numerous modifications to the disclosed embodiment can be made without departing from the spirit and scope of the invention. Accordingly, the invention is to be limited only by the following claims.

I claim:

1. A method for testing a subject symbology reader against a standard symbology reader, comprising the steps of:
   (a) producing test input signals substantially identical to predetermined input signals produced by symbology input device in response to the input of a predetermined symbology, the predetermined input signals being known to cause the standard symbology reader connected to the symbology input device to produce predetermined desired response signals;
   (b) directing the test input signals to the subject symbology reader;
   (c) recording the test response signals that the test input signals cause the subject symbology reader to produce; and
   (d) comparing the predetermined response signals and the test response signals to determine whether the test response signals are substantially identical to the predetermined response signals.

2. The method of claim 1 wherein step (a) comprises programming a computer to produce the test input signals on an output port of the computer and wherein step (b) comprises connecting the output port of the computer to the subject symbology reader.

3. The method of claim 2 wherein step (a) further comprises programming the computer to repeatedly produce the input signals.

4. The method of claim 2 wherein step (a) further comprises programming the computer to produce the input signals at random times.

5. The method of claim 1, further comprising the step of producing an indicator signal when the response signals of the subject symbology reader are significantly different from the predetermined response signals.

6. Apparatus for testing a subject symbology reader against a standard symbology reader, comprising:
   source means for producing test input signals substantially identical to predetermined input signals produced by a symbology input device in response to the input of a predetermined symbology, the predetermined input signals being known to cause the standard symbology reader connected to the symbology input device to produce predetermined desired response signals;
   means for directing the test input signals to the subject symbology reader;
   means for recording the test response signals that the test input signals cause the subject symbology reader to produce; and
   means for comparing the predetermined response signals and the test response signals to determine whether the test response signals are substantially identical to the predetermined response signals.

7. The apparatus of claim 6 wherein the source means is a computer programmed to produce the test input signals on an output port of the computer and wherein the means for connecting the source means to the subject symbology reader is connected to the output port of the computer.

8. The apparatus of claim 7 wherein the computer is programmed to repeatedly produce the input signals.

9. The apparatus of claim 7 wherein the computer is programmed to produce the input signals at random times.

10. The apparatus of claim 6, further comprising means for producing an indicator signal when the response signals of the subject symbology reader are significantly different from the predetermined response signals.

11. Apparatus for comparing a plurality of subject symbology readers against a standard symbology reader, comprising:

source means for producing test input signals substantially identical to predetermined input signals produced by a symbology input device in response to the input of a predetermined symbology, the predetermined input signals being known to cause the standard symbology reader connected to the symbology input device to produce predetermined desired response signals;

means for directing the test input signals to each subject symbology reader in the plurality of subject symbology readers;

means for recording the test response signals that the test input signals cause the subject symbology readers to produce; and means for comparing the predetermined response signals and the test response signals to determine whether the test response signals are substantially identical to the predetermined response signals.

12. The apparatus of claim 11 wherein the source means is a computer programmed to produce the test input signals on an output port of the computer and wherein the means for connecting the source means to the subject symbology reader is connected to the output port of the computer.

13. The apparatus of claim 12 wherein the computer is programmed to repeatedly produce the input signals.

14. The apparatus of claim 12 wherein the computer is programmed to produce the input signals at random times.

15. The apparatus of claim 11, further comprising means for producing an indicator signal when the response signals of the subject symbology reader are significantly different from the predetermined response signals.

16. A method for testing a subject symbology reader against a standard symbology reader, comprising the steps of:
   (a) producing test input signals substantially identical to predetermined input signals produced by a symbology input device in response to the input of a predetermined symbology, the predetermined input signals being known to cause the standard symbology reader connected to the symbology input device to produce predetermined desired response signals; and
   (b) directing the test input signals to the subject symbology reader;
   (c) comparing the predetermined response signals and the test response signals to determine whether the test response signals are substantially identical to the predetermined response signals.

17. The method of claim 16 wherein step (a) comprises programming a computer to produce the test input signals on an output port of the computer and wherein step (b) comprises connecting the output port of the computer to the subject symbology reader.

18. The method of claim 17 wherein step (a) further comprises programming the computer to repeatedly produce the input signals.

19. The method of claim 17 wherein step (a) further comprises programming the computer to produce the input signals at random times.

20. The method of claim 16, further comprising the step of producing an indicator signal when the response signals of the subject symbology reader are significantly different from the predetermined response signals.

* * * * *